April 4, 1967 C. M. L. L. BOURCIER DE CARBON 3,312,312
SHOCK ABSORBERS
Filed Dec. 23, 1964
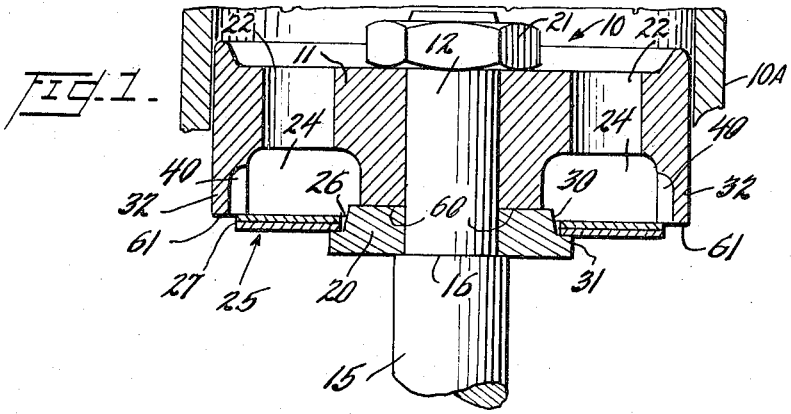
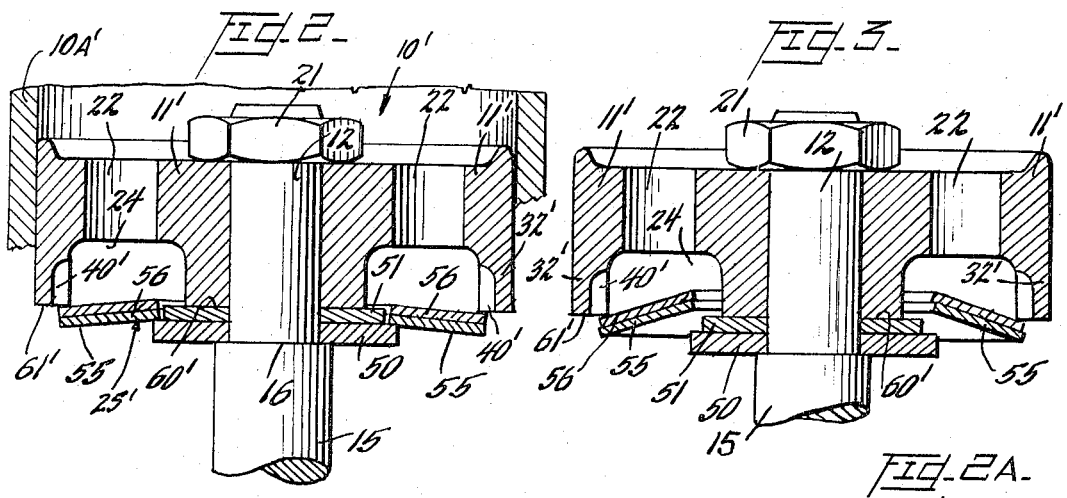
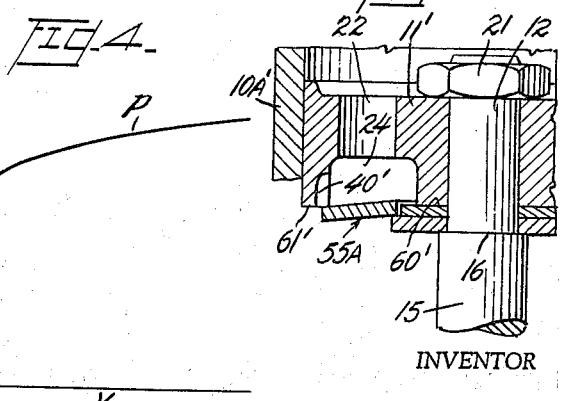
INVENTOR
C. M. L. L. Bourcier de Carbon
BY Watson, Cole, Grindle & Watson
ATTORNEYS United States Patent Office 3,312,312
Patented Apr. 4, 1967

3,312,312
SHOCK ABSORBERS
Christian Marie Lucien Louis Bourcier de Carbon,
64 Blvd. Maurice-Barres, Neuilly-sur-Seine, France
Filed Dec. 23, 1964, Ser. No. 420,756
Claims priority, application France, Jan. 9, 1964,
959,815
5 Claims. (Cl. 188—88)

This invention relates to flow controlling valving for the pistons of hydraulic shock absorbers, and more particularly of such shock absorbers as are applicable to motor vehicles or the like.

The present application has to do with shock absorber valving of the same broad classification as featured in my co-pending United States applications Ser. No. 275,767, original filing Oct. 9, 1962, now Patent No. 3,199,636, and Ser. No. 392,266, filed Aug. 26, 1964, now Patent No. 3,256,961. In those applications, there was disclosed a shock absorber embodying a working piston having a single clack valve operating in both directions, the valve made up either of one thin annular disc or a pack of such annular discs arranged between two concentric seats, the inside edge of the valve assembly working in connection with one of such seats upon which one of its faces rests, and the outside edge of the clack valve cooperating with the other seat upon which its other face rests.

The general object of the present invention is to provide a novel and improved double-acting disc valve installation which, although simple in construction and adaptation, results in great improvement of the operation of the shock absorber especially in apparatus such as a vehicle wheel suspension where it is subject to numerous rapid and violent stresses.

The present invention affords means whereby the adjustment and control of a shock absorber of this type may be accomplished in an easy manner to adapt the shock absorber to the specific machine to which it is to be applied and to attain the desired ratios of piston velocity-to-resistance under all conditions of operation.

The novel construction and arrangement offers at least two particular advantages, namely, the limiting of the resistance or stress at high speed velocities and the lessening or elimination of fatigue in the valve discs.

With the novel arrangements provided by the invention, assuming that other dimensions are suitably selected, there are only about three parameters relating to the valving which need be varied. With these adjustments, it is not necessary to modify any other dimension either of the piston or the other parts going to make up the shock absorber unit, to obtain any desired value for expansion and compression and at the same time achieve the most favorable resistance velocity laws simultaneously for operation of the shock absorber in both directions.

The valve installations disclosed in my above mentioned applications are provided with structural configurations adapted to center the annular valve discs with respect to the piston and piston rod, but one of the applicant's discoveries which feature the present invention, is that the discs may be maintained in concentric position by hydrodynamic forces and without physical guiding surfaces, centering ribs, or the like.

Other objects and features of novelty will be apparent from the following specification when read in connection with the accompanying drawings in which one embodiment of the invention is illustrated by way of example, the figures not being to scale but showing somewhat exaggerated thicknesses for the valve discs.

In the drawings:

FIGURE 1 is a vertical sectional view through a piston of a construction similar to those exemplified by my prior applications referred to above, and illustrated here for the sake of comparison with the features of the present advance;

FIGURE 2 is a similar view of a shock absorber piston embodying the principles of the present invention, the valve disc being in idle position;

FIGURE 3 is a similar view but showing the position of the valve discs during expansion or rebound movement of the shock absorber to which it is applied; and FIGURE 4 is a graph showing the curve peculiar to a shock absorber embodying the principles of this invention, resistance being plotted against piston velocity.

Referring first to FIGURE 1 illustrating the previous advance by the present applicant, it will be noted that the piston as a whole is indicated by the reference numeral 10 and comprises the body portion 11 reciprocatable within a cylinder 10A and having a central opening through which the narrowed or attenuated upper end 12 of the piston rod 15 extends. The junction between the rod proper and the extension 12 is constituted by a shoulder 16 upon which is seated an internal valve seating member 20 which also fits the rod portion 12 snugly and is clamped by the body portion 11 when the nut 21 is screwed down upon the stem or attenuated portion 12 of the rod. Openings 22 of large capacity pass through the somewhat narrow central portion of the body 11 of the piston and open downwardly into the annular chamber 24 of the piston.

The valve 25 which may consist of one or more thin metal annular plates or discs is provided with an inner edge 26 surrounding the central opening therein and an outer abrupt edge 27. The internal portion of the disc valve 25 surrounds the upwardly jutting internal portion 30 of the seating member 20 and rests upon the ledge 31 provided thereon.

The outer edge 27 of the valve 25 has its upper surface resting against the inner margin of the lower end surface 61 skirt 32 of the body portion 11 of the piston, and bearing preferably against a fairly restricted portion of the inner edge of the skirt.

In order to provide inwardly of the disc valve 25 a gradually opening slit for flow upwardly through the piston upon the rebound or expansion stroke, the surface 30 is of gradually diminishing diameter so as to give a gradually widening effect to the orifice upon flexure of the inner portion of the valve 25. This flow is through an annular slit bounded upon one side by the displaced inner lower corner of the inner boundary 26 of the disc valve 25 and the surface 30 of the seating member 20.

The outer edge of the valve 25 is for the control of the flow downwardly through the piston upon the occurrence of the compression stroke and thus, upon the opening of the exterior portion of the valve, the flow is past the sharp corners of the skirt 32 and between that corner and the slightly displaced upper surface of the outer margin 27 of the valve 25.

In order to provide the usual permanent passageways for permitting the slight flow in both directions under conditions of short movement of the piston as in boulevard riding, grooves or slots 40 are provided at intervals around the lower portion of the inner wall of the skirt 32.

In this prior construction, as in the present case, the flexible valve discs 25 are retained in place without any enveloping housing or gripping means, and by the simple support of one of the faces of the pile of discs on the lip or shelf 31 and the support of the other face of the discs at the outside edge upon the lower end of the skirt 32.

The improvements peculiar to the present advance consist in the utilization of certain arrangements which can be employed either together or separately, but the combination of which makes possible considerable progress in the comfort derived from the wheel suspensions of automotive vehicles, while at the same time affording a piston construction which is remarkably simple, economic, and precise in facilitating quantity production.

The first of these provisions consists in replacing the rigid integral support 20 comprising the conical portion 30 and the annular edge or shelf 31, by a set of two flat annular washers 50 and 51, as clearly shown in FIGURES 2 and 3 of the drawings. Such washers can readily be provided by simple cutting from a steel sheet but with a high degree of precision, this eliminating the necessity of any machining operation as would be necessary in producing the member 20 of the earlier embodiment.

Although the invention is not restricted to exact dimensions, it would be well to suggest an exemplary construction for a shock absorber of say 46 millimeters inside diameter. In such a case, the washer 50 could have a diameter of 19 millimeters and the thickness of 2.5 millimeters, whereas washer 51 could be of an 18 millimeter diameter and a thickness of say 0.60 to 6.80 millimeters.

The valve discs themselves, comprising the valving 25′ in the embodiment illustrated in FIGURE 2, the lower one indicated at 55 and the upper one at 56, are preferably installed with a slight play, with respect to the washer 51, this annular clearance having for example, a diameter of from 10 to 15 hundredths of a millimeter. It is easy to calculate that, for a diameter of 18 millimeters, such a play or clearance assures a passageway having a section of from 3 to 4 square millimeters, affording the thin slit between the washer 51 and the clack valve comprising the discs 55 and 56 This affords an open oil passage when the clack valve is lifted at least one-tenth of a millimeter, that is, an additional passage having an order of magnitude comparable to the surface of the permanent passageways. The utility of this provision will be understood from further description, but the actual extent of this play could be modified without departing from the scope of the present invention.

The second of the proposed arrangements consists in using a piston body 11′ having a lower end surface 60 for its central portion lying in the same horizontal plane as the lower end portion 61′ of the skirt 32. Experience has shown that a difference of several hundredths millimeters in the pre-stressing imposed on the valve discs is reflected by a considerable variation in the resistance to the movement of the piston.

When quantity production machining is involved, the most effective means of eliminating any disparity in the vertical distance between the bottom 61′ of the skirt 32′ and the lower surface 60′ of the central portion of the member 11 is to actually machine these two end surfaces so that they occupy exactly the same plane.

This construction cooperates very readily with the adjustment to be obtained for determining the resistance of the device. It is believed that this provision in this particular type of floating clack valve assembly is quite novel and it was only after considerable experimentation that the applicant discovered the practical possibilities of this particularly favorable solution in connection with the other provisions of the present invention.

The third of these cooperating arrangements or provisions consists in using two annular valve discs 55 and 56 and only two, and also providing that the thickness of the central washer 51 be slightly greater than the thickness of the lower disc 55 which contacts the washer 50, so as to assure, at the time of assembly of the various parts, the centering of the second or upper disc 56. However, the thickness of the upper central washer 51 is also less than the sum of the thicknesses of the valve wafers or discs 55 and 56 of the valve pack, so as to impose on the valve pack after it is put in place, a pre-stress corresponding to a bending or distortion having a value of $a$ plus $b$ minus H, these values deriving from the thicknesses respectively of the valve discs 55 and 56 and of the washer 51.

In certain installations, it will even be possible to use only one valve disc such as the disc 55A (see FIGURE 2A). In such a case, the thickness H of the central washer 51 will be less than the thickness $a$ of the disc 55A, so as to impose on this disc, at the time of assembly, a pre-stress corresponding to a bending or distortion having a value of $a$ minus H.

It is also obvious that under certain circumstances it will be possible to use a larger number of discs than two, without departing from the scope of the invention.

The operation of such a piston as set forth in FIGURES 2 and 3, during an expansion or rebound stroke of the shock absorber piston would be as follows:

(1) At low speeds, permanent passageways comprising for example, the notches 40′ made in the inner wall of the skirt 32′ near its lower end 61′, are sufficient to assure a certain flow of damping liquid and the valve disc pack remains immobilized between its two supports comprised by the projecting ledge of the washer 50 and the lower surface 61′ of the skirt. During this phase, the resistance F increases more rapidly than the piston velocity $v$, as can be observed on the curve shown in FIGURE 4 of the drawings in which resistance F is plotted against piston velocity $v$. This occurs along the curve from the point of origin O to the point $m$.

(2) At the velocity corresponding to the point $m$, the pack of valve discs begins to lift rapidly opening up, between the washer 51 and the inside bore of the valve discs 55 and 56, a passageway the section of which is already calculated, for example, as being of the order of 3 to 4 square millimeters in the given example. The velocity-resistance curve then bends toward the velocity axis before again beginning to increase but again bending toward the stress axis. This activity occurs between the points $m$ and $n$, and the point $n$ would correspond to the moment when the lower edge of the lower valve disc 55 has reached the level of the upper edge of the central washer 51, that is, corresponding to the moment when the bore of the clack valve assembly is free of the washer 51 as suggested in FIGURE 3 of the drawings.

(3) Beyond the point $n$, it is obvious that the section of the passageway between the washer and the clack valve assembly increases quite rapidly and the curve during its further traverse bends considerably toward the velocity axis, the increase of the resistance factor F beyond the point $n$ being limited to a very moderate value. (See the arc $p$ of the curve in FIGURE 4.)

It is precisely due to this arrangement (the relatively slight thickness or height of the washer 51) limiting to a moderate value the stresses imposed on the valve pack even at high speeds of the piston, which makes it possible to limit the valve construction to two discs (or even in certain cases to a single disc) without the risk of breaking the discs from excessive fatigue, which might be the case in connection with shock absorbers intended for use in automotive vehicle suspensions.

Actually, on the curve shown in FIGURE 4, there are no angular points at either $m$ or $n$, the two transitions between the three phases described, being very progressive and the curve representing resistance F as a function of velocity $v$ has an absolutely satisfactory behavior, achieving an almost linear progression at medium speeds and practically corresponding to the ideal form (F proportional to $v$) which is generally sought for this portion of the curve. Because of the technical beauty and appropriateness of the curve thus obtained, the advantages and professional interest in such a simple piston, which permits extremely easy fabrication, are very readily understood. However, it was only through considerable study and the repetition of extensive tests that such a simple arrangement was conceived and assurance obtained that it would be acceptable in practice in apparatus subjected to such numerous rapid and violent stresses as in the case of a vehicle shock absorber.

It is indeed obvious that at high piston velocities, corresponding to the portion of the curve of FIGURE 4 located beyond the point *n*, the valve pack then being completely disengaged from the central washer 51, as shown in FIGURE 3, there no longer exists any solid or metallic confining element capable of maintaining and assuring the centering of the valve pack which of course would appear to be absolutely necessary to maintain the washers in concentric relationship with the central washer and the other parts of the piston. Thus, prudence would have seemed to dictate that some such material or structural means should be provided. However, the applicant suspected as a result of many observations made during the course of numerous tests of the device and then verified experimentally and ultimately explained theoretically, that there existed an automatic and spontaneous centering phenomenon resulting from the considerable hydrodynamic forces being exerted on the slightly conic surface of the valve disc pack.

The functioning of this centering effect was found to be so perfect and effective that it is sufficient to assure, without danger of failure, the proper placement of the valve pack around the washer 51, and this of course despite the smallness of the play between the discs and the washer 51. Prolonged tests made on a number of vehicles under conditions of travel on most difficult terrain has confirmed the absolute reliability of this hydrodynamic centering phenomenon during operation, and thus the practical value of this solution has been amply confirmed. This curious discovery justifies the characterization of the valving as a freely floating valve assembly.

The discs 55 and 56 used in providing the valve assembly are preferably flat annular discs cut from a plane surface, but it is understood that it would not be beyond the scope of the present invention to use discs previously deformed either under cold or hot conditions so as to present in the free or relaxed state a slightly conic profile.

It is particularly interesting to note that, as other dimensions are suitably selected, it is sufficient to vary only the three following parameters:

(1) the thickness of the discs 55 and 56;
(2) the thickness of the central washer 51;
(3) the size of the permanent passageways 40;

without it being necessary to modify any other dimension either of the piston or other parts going into the shock absorber unit, to obtain any desired value for expansion and compression; and this in a manner practically independent for both conditions and achieving at the same time the most favorable resistance-velocity laws simultaneously for expansion and compression.

A very interesting result which was not foreseeable in advance is involved in the present invention and this concept offers considerable practical value because it makes it possible to obtain, by a simple assembly of a very small number of constituent parts prepared in advance, all of the desirable settings which are, of course, different for each vehicle.

Of course, the provision of a central obstructing projection of slight altitude, so as to provide during the expansion stroke, a very considerable passage of damping oil when the distortion of the discs reaches a certain value, would not be outside of the scope of the invention even in cases where more than two disc are employed. Such an arrangement, which is made possible by the described spontaneous hydro-dynamic centering of the valve, actually presents the following two advantages: (1) limiting the stress F at high velocities *v* of the piston; and (2) limiting the fatigue in the discs themselves.

It should also be noted that in certain particular cases, for example, in automobile suspensions with a reverse movement of the shock absorber parts (Citroen 2 CV, Renault R4, etc.) the compression movement must face the greater resistance. It is quite evident that in such a case all of the above developments are still valid, with the single proviso of reversing the mounting of the various parts of the piston on the end of the rod and also exchanging in the above descriptions the terms "expansion" and "compression."

Within the scope of the rule of patentable equivalency, it is understood that instead of being formed of separate elements, one or both of the washers might be made integral with either the body of the piston or the piston rod, just so they conform in other respects with the purposes and principles of the invention.

It is understood that various other changes and alterations may be made in the specific embodiments described herein without departing from the scope of the invention as determined by the sub-joined claims.

Having thus described the invention, what is claimed as new and desired to be secured by Letters Patent is:

1. In a direct acting piston-and-cylinder shock absorber, which includes a cylinder containing damping fluid: a piston rod and a piston disposed for reciprocation in said cylinder; means for bypassing damping fluid through the piston from one side to the other, said means including an annular cavity formed in one side of the piston and having inner and outer circular walls, the inner wall comprised by a substantially cylindrical axial projection concentric with and surrounding the piston rod, the outer wall comprised by an annular peripheral skirt extending axially from the piston in the same direction as said cylindrical projection, a washer concentric with said piston rod and said inner cylindrical projection and carried in fixed position with relation thereto and spaced axially from said inner cylindrical projection, a valve member comprising at least one thin annular resilient valve disc positioned across said cavity and having its radially outer marginal portion seated against the outer portion of said annualar skirt for movement in an axial direction away from said skirt, and its radial inner marginal portion seated upon said washer for movement away from said washer in the opposite axial direction, whereby movement of said piston in one direction causes pressure of damping fluid against the valve member in the opposite direction and causes the valve member to yieldably flex away from one of its seats and afford an annular opening between the adjacent portions of the valve member and the seat for the controlled passage of fluid therethrough, and a second washer removably positioned immediately axially inwardly of said first named washer, in the space between the first named washer and the inner cylindrical projection, and of an outside diameter less than that of said first washer and also less than the inside diameter of said valve member, said valve member being free of any lateral confinement either radially inwardly or outwardly in any of its positions.

2. The shock absorber as set forth in claim 1 in which the outside diameter of said second washer is also greater than that of the center cylindrical projection of the piston, and the thickness of said second washer being less than the displacement away from said first named washer of the radially inward seating surface of said valve member, upon the attainment of exceedingly high piston velocities.

3. The shock absorber as set forth in claim 1 in which the central cylindrical inner projection and the outer skirt portion of the piston are coextensive whereby the extreme ends of said projection and said skirt are in the same transverse plane, and in which the valve member comprises one floating disc, the thickness of said second named washer being less than the thickness of the disc whereby an initial pre-stress is imposed on the valve disc upon installation as described.

4. The shock absorber as set forth in claim 1 in which the central cylindrical inner projection and the outer skirt portion of the piston are coextensive whereby the extreme ends of said projection and said skirt are in the same transverse plane, and in which the valve member comprises two superposed floating disc, the thickness of said second named washer being greater than the thickness of the outer one of the two discs but less than the combined thicknesses of the two discs whereby an initial pre-stress is imposed on the valve discs upon installation as described.

5. The shock absorber as set forth in claim 4 in which the outside diameter of said second washer is also greater than that of the central cylindrical projection of the piston and in which the axially inwardly disposed washer is thinner than the outer washer.

References Cited by the Examiner
UNITED STATES PATENTS

| | | | |
|---|---|---|---|
| 2,230,697 | 6/1943 | Binder | 188—88 |
| 3,180,453 | 4/1965 | Murata | 188—96 |
| 3,199,636 | 8/1965 | De Carbon | 188—96 |

FOREIGN PATENTS 1,065,526  1/1954  France.

MILTON BUCHLER, *Primary Examiner.*

G. E. A. HALVOSA, *Assistant Examiner.*